United States Patent [19]

Bedford, Jr.

[11] Patent Number: 4,951,595
[45] Date of Patent: Aug. 28, 1990

[54] TEMPORARY INDICATORS

[76] Inventor: William Bedford, Jr., 5620 Palmyra Rd., Pittsford, N.Y. 14534

[21] Appl. No.: 877,285

[22] Filed: Jun. 23, 1986

Related U.S. Application Data

[63] Continuation of Ser. No. 716,983, Mar. 28, 1985, abandoned.

[51] Int. Cl.⁵ .................................................. G01D 11/00
[52] U.S. Cl. ..................................... 116/200; 116/240
[58] Field of Search ................ 40/2 R, 352, 361–367, 40/585, 594, 595; 116/200, 209, 235, 240, 332; 353/36, 42, DIG. 5

[56] References Cited

U.S. PATENT DOCUMENTS

| | | | |
|---|---|---|---|
| 2,242,735 | 5/1941 | Widess | 434/153 |
| 3,583,358 | 6/1971 | Hanson, Jr. | 116/235 |
| 3,924,879 | 12/1975 | Wright | 40/594 |
| 3,998,535 | 12/1976 | Clarke | 353/DIG. 5 |
| 4,164,822 | 8/1979 | Batton | 40/361 |
| 4,175,777 | 11/1979 | Horn | 40/359 |
| 4,194,122 | 3/1980 | Mitchell et al. | 40/594 |

FOREIGN PATENT DOCUMENTS

| | | | |
|---|---|---|---|
| 2412856 | 9/1975 | Fed. Rep. of Germany | 116/200 |
| 29534 | 2/1984 | Japan | 40/612 |
| 747 | of 1911 | United Kingdom | 40/594 |

Primary Examiner—William A. Cuchlinski, Jr.
Assistant Examiner—W. Morris Worth
Attorney, Agent, or Firm—Robert M. Phipps

[57] ABSTRACT

An indicating device for use with x-rays and similar light transmitting substrates is constructed as a flat, rigid, translucent material coated on one side with a light transmitting temporary adhesive which will temporarily secure the indicator to the substrate at the point of interest.

4 Claims, 1 Drawing Sheet

TEMPORARY INDICATORS

This is a continuation of application Ser. No. 716,983 filed Mar. 28, 1985, now abandoned.

BACKGROUND

1. Field of the Invention

This invention relates to temporary indicators affixed to light transmitting substrates.

2. Description of the Prior Art

Light transmitting substrates in the form of transparencies, x-ray film, positive photograhic film and the like are useful in conveying information. In use, these substrates are viewed with a source of light placed behind them. Very often, to call attention to a portion of the substrate, a person would touch the surface of the substrate with a finger, a pointing device, pencil or marker. This practice can, and often does, result in permanent scratches and nicks on the substrate surfaces The use of grease pencils and china markers often results in marks which are most difficult to remove. By the same token, the marks made by felt tipped pens and ball point pens are seldom removed without permanent damage to the substrate surface. Any of the foregoing damage is most objectionable when the substrate is an x-ray, positive film or the like that cannot be replaced. The marks are also objectionable to the further use of the x-ray and its diagnostic value simply because they obscure, if not completely masks out, the data on the substrate. Additionlly, marks can be misleading when the substrate is referred to a second party for independent consideration. Thus, a means for pointing out portions of interest on the substrate and yet both lessen damage and increase useability of substrate data is needed. The pointing means must be useable at all degrees of elevation from the horizontal since overhead viewers are designed for use with a flat, horizontal transparency and x-rays are typically viewed with a view box having a generally vertical viewing surface.

SUMMARY OF THE INVENTION

In accordance with this invention there is provided an indicating means for use on light transmitting substrates which comprises a flat, rigid, translucent base member, whose width is substantially greater than its thickness, coated with a light transmitting temporary adhesive on one of the flat width surfaces.

DESCRIPTION OF THE PREFERRED EMBODIMENT

Figure 1:
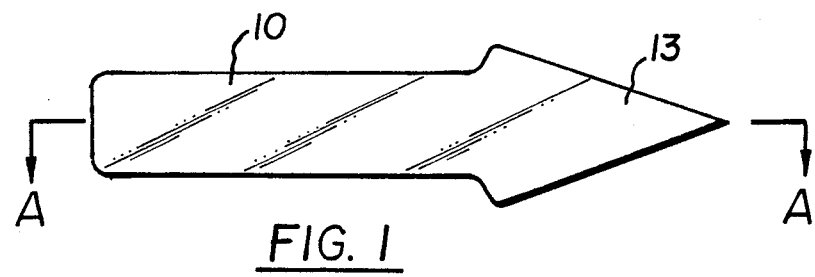
FIG. 1 is a top (plan) view of the indicating means of this invention 10 in the shape of an arrow.

As shown in FIG. 1 the indicating means of this invention 10 may have the shape of a conventional arrow. The shape may, however, be varied to any desired configuration so long as it visually directs or focuses the viewer's attention to the desired area of the x-ray, film or other transparency. Thus, the indicating means 10 may also be the letter C in which case the gap between the ends of the letter would point out the section to be highlighted. Indicating means 10 may also have a delta wing or pencil shape; hence, any vision directing shape may be employed. Indicating means 10 has two flat sides 13, 14 which are greater in width than its thickness. Additionally, the length is greater than the width.

The indicating means 10 is made from a translucent rigid plastic such as polymethacrylate, polyacrylate, polystyrene, copolymers of methacrylates and acrylates, polycarbonates, cellulose acetate butyrate and the like. The indicating means 10 can be cut or stamped from a sheet of the desired plastic, formed by injection molding, or other methods well known in the fabricating art. A convenient but not critical thickness for indicating means 10 is about 1/16 of an inch (about 1.5 mm). Indicating means 10 contains small amounts of coloring agent, e.g. a dye or pigment, so that it is translucent but does not obscure the x-ray or other transparency. The color selected is one of choice, however greater effectiveness is achieved when a light color, e.g. yellow or white, is used with a dark transparency and a darker color, e.g. some greens or orange, are used with lighter, e.g. "thinner", transparencies.

Figure 2:
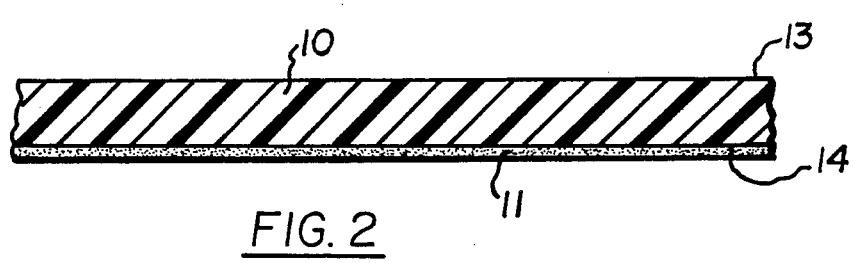
FIG. 2 is an enlarged cross section of the indicating arrow of FIG. 1 taken along line AA.

As shown in FIG. 2 indicating means 10 is lightly coated on flat side 14 with a low tack, cold setting, transparent or translucent adhesive 11. The exact composition of the adhesive is not critical. The adhesive 11 should permit removing the indicting means 10 from the transparency by simple grasping indicating means 10 with the user's fingers. Additionally, the adhesive 11 should not lift or remove the information, design, etc., intended to be permamently maintained on the transparency, e.g., not remove the emulsion coating of the x-ray or photographic film. Suitable adhesives 11 include paper (rubber) cement, artist's repositioning cement and the like. Typically these adhesives contain benzene, xylene, methylene chloride, hexane, aliphatic hydrocarbons, turpentine and mixtures thereof as a solvent. Natural rubber, various synthetic rubbers, elastomeric resins, polyesters and acrylates and the like alone or in combinations thereof are useful adherents for these adhesives. As is well known in the art, the adhesive 11 may be applied by spraying, roller coating or other convenient means.

The indicating means 10 is affixed to the desired x-ray or positive photographic film by lightly pressing the adhesive side 11 against the transparency. The doctor, radiologist or other primary health care provider when interpreting the x-ray mounted on the view box for the benefit of patients or other medical personnel, applies the indicating device 10 to that part of the x-ray to which attention is called. A differently colored indicating device 10 can be affixed to x-ray to high light the next area of concern. This process is continued until all points of concern have been marked and discussed. The indicating means 10 can be left on for future radiographic studies or removed without damaging the x-ray as the interpreter desires This indicating device 10 can be easily removed, stored by lightly pressing the adhesive coated side 14 against the side of the x-ray view box, then removed, used and stored again and again until the adhesive value is exhausted.

Figure 3:
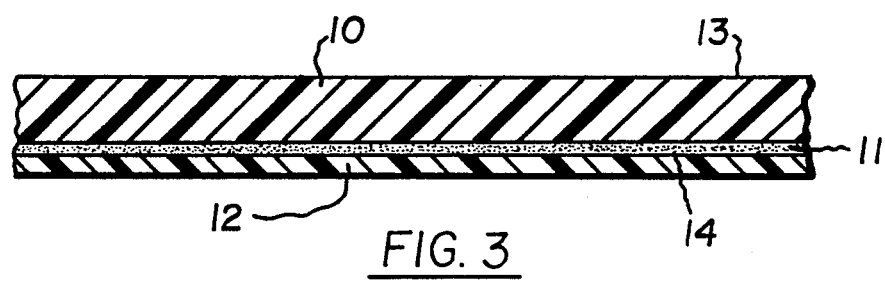
FIG. 3 is the enlarged cross section of the indicating arrow of FIG. 2 to which a separating member has been added.

Because the indicating means 10 may be prepared and used in different locations or simply stored for sometime before use, it is desirable to apply to the exposed adhesive layer 11 a separator 12 as shown in FIG. 3. The separator can be a film, e.g. polyester such as that sold by E. I. du Pont Company under the registered trademark MYLAR, or a silicone treated paper. The separator 12 is stripably removed just prior to use of indicating means 10.

The foregoing methods have been described above for the purpose of illustratuion and not limitation. Many other modifications and ramifications will naturally suggest themselves to those skilled in the art based on this disclosure. These are intended to be comprehended as within the scope of this invention.

The embodiments of the invention in which an exclusive property or priviledge is claimed are defined as follows:

1. A method of temporarily indicating data on light transmitting substrates by
   (1) adhering to the substrate at the point of interest an indicator for temporary use on light transmitting substrates having text and or graphic information on the surface thereof which comprises in combination
      (a) a flat, rigid, translucent base member whose width is substantially greater than its thickness, said base member containing a dye or pigment, said dye or pigment being present in such an amount and of such a color that when light for reading said substrate is passed through said substrate having indicating means adhered thereto there is produced a visual indicating contrast between said indicating means and said substrate, and
      (b) a coating of light transmitting temporary adhesive on one of the flat surfaces of said base member for adhering indicating means to said substrate, and
   (2) passing light for reading said substrate through said substrate having said indicating means adhered thereto said indicator having a vision directing shape, said substrate being an x-ray film or positive photographic film.

2. The method of claim 1 wherein the substrate is maintained in a substantially vertical plane.

3. The method of claim 2 wherein the substrate is an x-ray film.

4. The method of claim 3 wherein a plurality of said indicating means are used to mark one or more points of interest.

* * * * *